United States Patent [19]

Lee et al.

[11] Patent Number: 4,493,810
[45] Date of Patent: Jan. 15, 1985

[54] METHOD AND APPARATUS FOR MEASURING REACTIVITY OF FISSILE MATERIAL

[75] Inventors: David M. Lee, Los Alamos; Lloyd O. Lindquist, Santa Fe, both of N. Mex.

[73] Assignee: The United States of America as represented by the United States Department of Energy, Washington, D.C.

[21] Appl. No.: 415,616

[22] Filed: Sep. 7, 1982

[51] Int. Cl.$^3$ .............................................. G21C 17/00
[52] U.S. Cl. ................... 376/254; 376/257; 376/245
[58] Field of Search ............... 376/257, 266, 159, 254, 376/245

[56] References Cited

U.S. PATENT DOCUMENTS

| | | | |
|---|---|---|---|
| 3,636,353 | 1/1972 | Untermyer | 376/257 |
| 3,755,675 | 8/1973 | Stepan | 376/257 |
| 4,335,466 | 6/1982 | Lee | 376/257 |

OTHER PUBLICATIONS

Lee, David M., Passive & Active Neutron Methods for Assay/Verification of Spent Fuel, Mar. 15–30, 1982.
Keepin, Robert G., Nuclear Safeguards R&D LA-83-73-PR, Sep. 1980.

Primary Examiner—Donald P. Walsh
Attorney, Agent, or Firm—Joseph M. Hageman; Paul D. Gaetjens

[57] ABSTRACT

Given are a method and apparatus for measuring nondestructively and non-invasively (i.e., using no internal probing) the burnup, reactivity, or fissile content of any material which emits neutrons and which has fissionable components. No external neutron-emitting interrogation source or fissile material is used and no scanning is required, although if a profile is desired scanning can be used. As in active assays, here both reactivity and content of fissionable material can be measured. The assay is accomplished by altering the return flux of neutrons into the fuel assembly. The return flux is altered by changing the reflecting material. The existing passive neutron emissions in the material being assayed are used as the source of interrogating neutrons. Two measurements of either emitted neutron or emitted gamma-ray count rates are made and are then correlated to either reactivity, burnup, or fissionable content of the material being assayed, thus providing a measurement of either reactivity, burnup, or fissionable content of the material being assayed. Spent fuel which has been freshly discharged from a reactor can be assayed using this method and apparatus. Precisions of 1000 MWd/tU appear to be feasible.

14 Claims, 7 Drawing Figures

METHOD AND APPARATUS FOR MEASURING REACTIVITY OF FISSILE MATERIAL

This invention is a result of a contract with the Department of Energy (Contract No. W-7405-ENG-36).

BACKGROUND OF THE INVENTION

The present invention relates generally to passive methods and apparatus for measuring fissionable materials which emit neutrons and relates more particuarly to passive methods and apparatus for measuring spent fuel assemblies.

Assaying (i.e., measuring the fissionable content of) spent fuel is important for nuclear safeguards in order to prevent unauthorized diversion of the nuclear material, to provide information necessary for criticality control of spent-fuel storage pools, and to provide process control for reprocessing and reactor operation. Measurement techniques for the assay of spent fuel have included passive and active neutron methods and passive gamma-ray methods. In active neutron methods, an external isotopic neutron source is used to interrogate the spent fuel, whereas in passive methods, no external neutron source is used.

When an assay is performed, the goal is to determine the fissile content (i.e., the amounts of uranium and plutonium) in the material being assayed. It is well known in the art that the ratio of Pu/U and fissile content can be correlated to both burnup and reactivity, where burnup is a measure of the number of fissions which occurred in the fuel while the fuel was within the reactor and where reactivity is related to burnup. This is disclosed for example in S. T. Hsue et al., "Nondestructive Assay Methods for Irradiated Nuclear Fuels," Los Alamos Scientific Laboratory Report LA-6923, January 1978. Reactivity depends upon how long the fuel has been in the reactor and not upon cooling time (which is the length of time the fuel has been out of the reactor). Fissile content, reactivity, and burnup can be correlated. Therefore, these quantities can be considered equivalent because the measurement of one quantity can provide a means of determining the other quantities.

Passive gamma-ray measurements and passive neutron measurements have been correlated with burnup and have provided a means of verifying the fissile material inventory of spent fuels. However, passive gamma-ray assay is not sensitive to the interior of the spent fuel assembly and therefore cannot truly verify the integrity of the interior fuel rods. Passive gamma-ray assay makes the assumption that the interior fuel rods are present in the fuel assembly and have not been tampered with.

The technique of passive neutron assay relies on correlations between the neutron emission rate and declared burnup to determine the fissile content of the spent fuel assembly. The neutron emission rate is N passive = M·S, neutron rate where M is the multiplication of the assembly (which is defined as $M \equiv 1/(1-k_{eff})$ where $k_{eff}$ is the effective multiplication constant of the fuel asembly) and S is the spontaneous fission rate of the isotopes of Pu and Cm and the emission rate due to the ($\alpha$,n) reactions. For pressurized-water reactor (i.e., PWR) fuel assemblies, good correlation between the U and Pu content and the neutron rate has been observed, although a substantial fraction of the neutron emission rate is due to Cm isotopes. This good correlation is due primarily to the fact that the Cm production rate is a uniform function of burnup. However, good correlations do not always exist for boiling-water reactor (BWR) fuel assemblies because (as has recently been shown by T. Yokoyama et al. in "Measurement and Analysis of Neutron Emission Rate for Irradiated BWR Fuel," Journal of Nuclear Science and Technology, 18, pp. 249–260 (April 1981)) the relationship between the neutron emission rate and burnup for these assemblies is double-valued (rather than a single-valued functional relationship). The transuranic production chain depends on the thermal-to-epithermal neutron ratio in the irradiation environment; and in BWR reactors this ratio depends upon the void fraction. For the same burnup, the upper portion of the fuel assembly has more transuranium nuclides than the lower portion because the increased void fraction in the upper portion of the fuel assembly causes the neutron energy spectrum to be harder (i.e., have higher energy) than in the bottom portion of the fuel assembly.

Active assay systems (wherein an external isotopic neutron interrogating source or external fissile material is used) have long been considered to give the best assay results. A determination of the amount of fissionable material and a determination of the reactivity can both be made by using active assay techniques. Here, an external neutron source or a neutron source and external fissile material induces the fissions in the U and Pu isotopes. The fission neutrons are detected and correlated to either burnup, the fissile content, or reactivity. The interrogating sources can be either isotopic sources (for example, $^{252}$Cf, $^{124}$Sb-Be, AmLi, etc.) or can be accelerator sources (for example, sealed-tube neutron generators). Systems based on prompt and delayed neutron counting using either $^{252}$Cf, $^{124}$Sb-Be, or neutron generators have been designed and tested; however, these systems require strong sources (e.g., 3Ci $^{252}$Cf and 800Ci $^{124}$Sb-Be) so that the induced signals can be measured in the presence of strong passive neutron emission rates (which are the noise in the system). For high burnup and freshly discharged reactor fuel, the strength of the interrogating source needed to overcome the passive neutron rate can be prohibitively large. Furthermore, when an active system is used to assay, either the fuel material being assayed must be scanned or multiple isotopic sources must be used. Additionally, with active assay systems the measurement geometry is limited because the neutron source is usually a point source.

Therefore, despite the assay systems which have been available in the prior art, a need has existed until now for a method and apparatus which has the measurement capability of an active system for measuring both reactivity and content of fissionable material but which does not require scanning nor use of an external isotopic neutron source or external fissile material and which in particular does not require use of large isotopic sources.

SUMMARY OF THE INVENTION

Objects of this invention are an apparatus and method for measuring both reactivity and quantity of fissionable material without requiring scanning and without the use of any external isotopic source or external fissile material.

Other objects of this invention are a method and apparatus which are capable of assaying any fissionable material which emits neutrons.

Other objects of this invention are a method and apparatus for assaying any spent-fuel assembly, including spent fuel which has been freshly discharged from a reactor.

Still further objects of this invention are a method and apparatus for assaying in which the geometry being used in the measurement can be chosen as desired.

Other objects of this invention are a method and apparatus for measuring the fissile content of fuel rods or assemblies before they are placed into cooling pond storage arrays, without using large isotopic sources, as would be required in active systems of the prior art.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the method of nondestructively and non-invasively (i.e., using no internal probing) measuring any material which emits neutrons and has fissionable components, using no external neutron emitting interrogation source comprises: (a) making a first measurement and a second measurement of the neutron count rate of the fissile material being measured while the fissile material is located within a multiplying system (defined below) by using a suitable neutron or gamma detector, wherein the first measurement is made with a reflector material located adjacent to and in close proximity to the multiplying system being measured and the second measurement is made with a different reflector material located adjacent to the multiplying system, (where the adjacent reflector material can be a vacuum); and then (b) using the two measurements made in step (a) to correlate to either reactivity, burnup, or fissile content of the material being measured. The multiplying system is defined to be all fissile material within an arbitrarily chosen physical boundary, together with any moderator material or other material inside the physical boundary which may come in contact with the fissile material being measured. Thus, the multiplying system being measured includes the fissile material being measured and any moderator material (for example, water) or other material (e.g., NaK in an LMFBR fuel assembly, wherein the NaK is not a strongly moderating material) which comes in contact with the fissile material being measured and which is within the chosen arbitrary physical boundary. A critical feature of the method of the invention is that the multiplying system within the physical boundary is the same when the first and second measurements are made and that only the reflector material is changed. It is also to be understood that all measurements are made after the material being measured is neutronically isolated from other materials.

The present invention also comprises, in accordance with its objects and purposes, an apparatus for nondestructively and non-invasively measuring at least one quantity selected from the group consisting of burnup, fissile content, and reactivity of any material which emits neutrons, which has fissionable components, and which is located within a multiplying system, without using any external neutron-emitting interrogation source, wherein the multiplying system is bounded by an arbitrarily chosen physical boundary and wherein the multiplying system comprises the fissile material and other material which may come in contact with the fissile material, the apparatus comprising:

(a) a support means for supporting the multiplying system in a fixed, reproducible position;

(b) a detection system comprising at least one detector which detects at least one type of particle selected from the group consisting of neutrons and gamma rays, wherein the detection system is located in a fixed position spaced apart from said multiplying system and wherein the detection system can be operably connected to a means for operating the detection system;

(c) a first reflector material (i) to be located in a reproducible first position such that at least a portion of the first reflector material is located adjacent to but not necessarily surrounding the multiplying system while a first measurement is made with the detection system, and then (ii) to be next removed from the first position;

(d) a second reflector material to be positioned in substantially the first position when the first reflector material is removed from the first position and while a second measurement is made with the detection system; and (e) a means for alternately positioning the first reflector material and the second reflector material adjacent to the multiplying system.

It is emphasized that here only the reflector material is changed.

Although in active assaying systems two measurements of count rates are made, an external isotopic source is used in active assaying for one of these measurements. This is quite different from the method and apparatus of the present invention wherein no external isotopic source is used and wherein only the self-interrogation of the system is used. In the present invention, instead of an external source, the system acts as an internal sink or source when the reflector material is changed because the reactivity has changed (thus changing the number of neutrons returning into the material being measured). Here, the fissile material being assayed is used as the neutron source itself.

By using the method and apparatus of the invention, a much simpler, safer, and more elegant way of assaying the material being measured is possible. No external isotopic source is needed, and in particular no large isotopic source is needed to overcome any noise problem. Furthermore, no scanning is required and the measurement geometry can be chosen as desired. No cooling time correction is needed (as is required in prior art passive methods). Until the development of this method, active systems provided the best assay measurements because both reactivity and amount of fissionable material were capable of being measured with the same system. That same measurement capability is also an attribute of the method and apparatus of the present invention, as is the advantage over active systems that here there is no problem with large external sources and excessive passive neutron rates.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DESCRIPTION OF THE PREFERRED EMBODIMENTS

Throughout the following, the term "reflector" material is used to mean a material which partially or totally surrounds the multiplying system being measured.

As stated above, effective multiplication constant $k_{eff}$ of a material is related to the multiplication M of that material by the relationship $M \equiv 1/(1-k_{eff})$, where $k_{eff}$ is the effective multiplication constant of the material.

In the method of the invention, the reflector is changed, causing a change in the effective multiplication constant; and this change results in a change in the detected neutron count rate.

Figure 1:
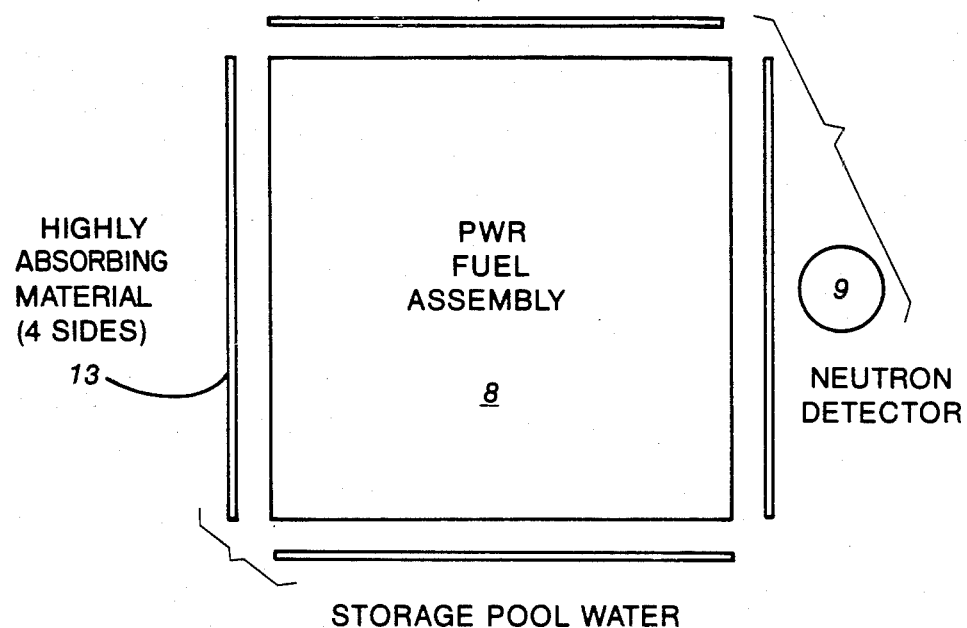
FIG. 1 is a conceptual illustration of the simplest form of a self-interrogation assay system according to the invention.

Referring to the drawing in FIG. 1, a self-interrogation system in its simplest form is shown. The self-interrogation method is based on changing the neutron absorption or reflection in the vicinity of the fuel assembly 8 (which can be for example from a pressurized water reactor, PWR, or boiling water reactor, BWR) and measuring the subsequent change in the neutron signal with the neutron detector 9. The change in the count rate is a result of the reactivity or multiplication of the system changing; the count rate changes when the material 13 external to the system alters the nonleakage probability, P, defined below.

A spent-fuel assembly (as well as any neutron-emitting fissile material) can be treated as a multiplying system. As such, the neutron flux N can be approximately written as $$N = M \cdot S; \, M = 1/(1 - k_{eff}),\quad (1)$$

where M is the multiplication of the system, $k_{eff}$ is the effective multiplication constant, and S is a source term. S is the unmultiplied source strength resulting from spontaneous fission of the transuranic isotopes (mostly curium isotopes), $(\alpha,n)$ neutrons from alpha particle reactions, and induced fissions. The multiplication M of the system depends on the amount of fissionable material, the geometry, the moderator, and the reflector material. The effective multiplication constant $k_{eff}$ is defined as $$k_{eff} = k_\infty \, P, \quad (2)$$

where $k_\infty$ is the infinite multiplication constant for an infinite system and P is the nonleakage probability. For a first reflector material A, the neutron flux is $N_A$; and for a second reflector material B, the neutron flux is $N_B$. Thus, the change in neutron flux between material A and B is $$N_A - N_B = (M_A - M_B)S$$
$$= M_A M_B \Delta k_{eff} S;$$
$$\Delta k_{eff} = k_A - k_B = k_\infty(P_A - P_B)$$

Therefore, $$\frac{N_A - N_B}{N_A} = M_B \Delta k_{eff} = \frac{\Delta k_{eff}}{1 - k_A + \Delta k_{eff}}. \quad (3)$$

Equation (3) is the basis for the self-interrogation technique where $\Delta P$ is a constant for this system because only the reflector material is changed. The left side of the equation is equal to the count rate change and the right side depends upon the multiplication $M_B$ and change in nonleakage probability $(P_A - P_B)$ of the system. A correlation of Eq. (3) to fissile content (burnup) provides a means of measuring the fuel assembly. In the prior art $k_{eff}$ was changed by changing $k_\infty$ or may have been changed by changing $k_\infty$ and P, whereas here only P is changed.

It is required in the method of the invention that any and all changes in reactivity of the material being assayed arise only from a change in the reflector material which is external to the physical boundary of the material being analyzed, and not from any change in the multiplying system (where the multiplying system was defined above). It is believed that this method has never been done before. Thus, it is required that in the time period during which the first and second measurements (described above) are taken that there be no change in the moderator material or other material that comes in contact with the material being assayed, that there be no change in the geometry of the multiplying system, and that there be no change in any other variable of the multiplying system. The requirement that these variables not change is critical because each of these variables influence the reactivity which is being measured; and it is important that the measurement of the reactivity in the method of the invention depend only upon changing the reflector material external to the multiplying system.

In the method and apparatus of the invention, any change in reflector material (which is located externally to the multiplying system of the material to be assayed) can be used, provided that a change in neutron count rates occurs when one reflector material is substituted for another. Therefore, examples of suitable changes in reflector material include but are not by any means limited to (a) making one measurement with water and another with Cd and (b) making one measurement with graphite and another with Cd.

After the two measurements of count rates are obtained for a given multiplying system (which must be kept constant for the two measurements), then the difference between the two measurements is obtained. That difference in neutron count rates is then correlated (as described below) to the reactivity (or burnup or multiplication or content of fissile material) of the system being assayed by comparing with a previously determined correlation with standards for which the burnup, fissile content, or multiplication is known.

Because burnup, reactivity, and fissile content can each be correlated one with another, these quantities are equivalent.

The two measured values of neutron count rates can be correlated to the burnup of the material being measured in any of several possible ways. In one way, the difference between the two rates is divided by the first measured rate (or alternatively, the difference between the rates is divided by the second measured rate), thus providing a normalized value of the change in neutron count rate. This value then can be correlated to burnup or reactivity by comparing with a previously determined calibration of burnup or fissile content or multiplication of known spent fuel assemblies or from calculational techniques that have been experimentally verified.

Alternatively, the measurement can be developed in a number of other ways, including a ratio of the two measurements. This value can then be correlated to burnup or reactivity, as described above.

In the apparatus of the invention, it is required that there be a means for holding the fissile materials in a reproducible, fixed position and that there be a means for maintaining the reflector materials in a reproducible position.

Figure 2:
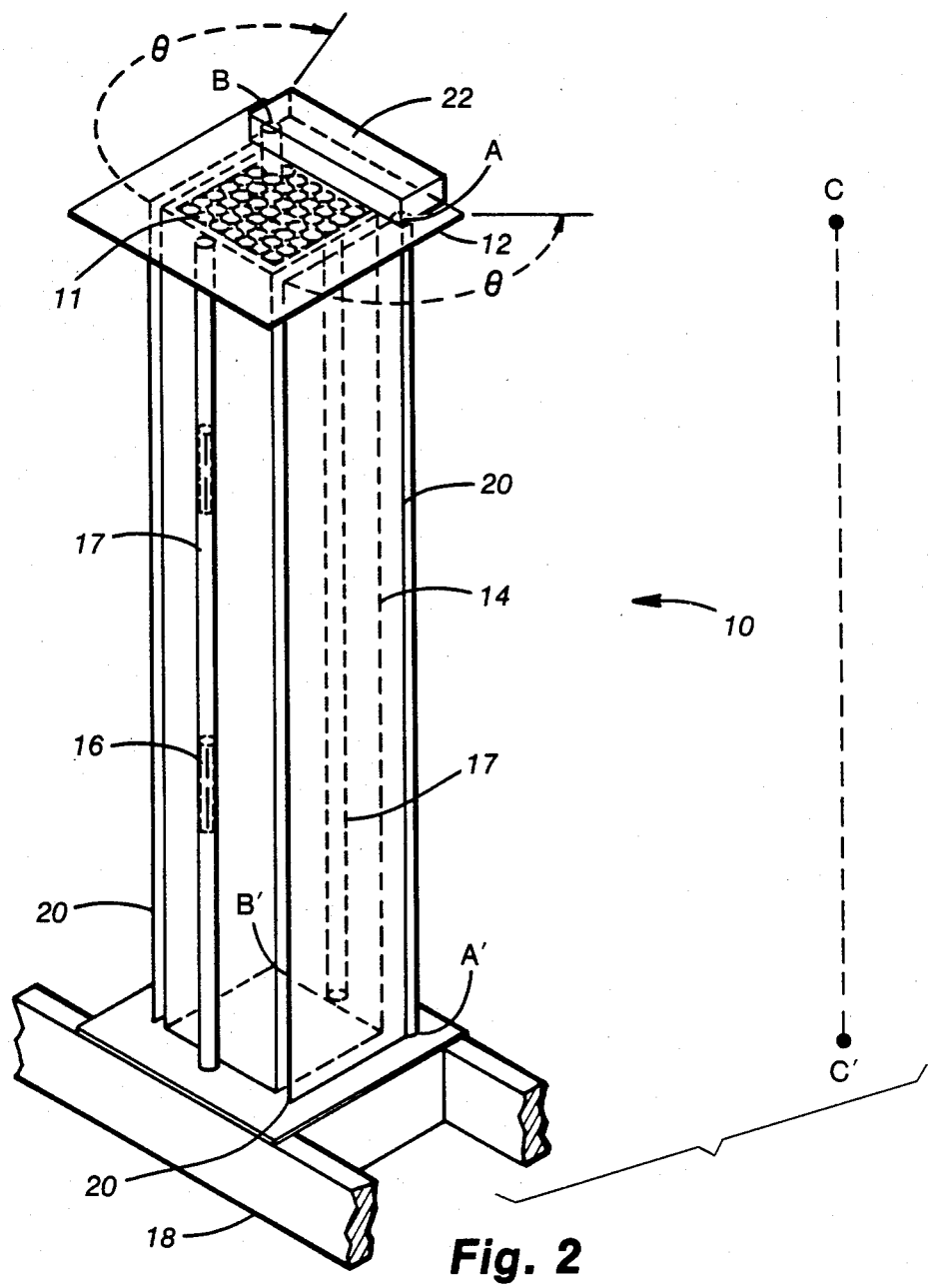
In FIG. 2 is shown an embodiment of the apparatus of the invention without axial scanning, suitable for carrying out the method of the invention. In this embodiment, neutron reflector plates are rotated away from the stationary fuel assembly located in water thus producing a change in the reactivity of the system. The reflector plates are the first reflector material, and the water is the second reflector material. A profile of the local multiplication constant can be obtained if desired.

In FIG. 2, an embodiment showing a stationary self-interrogation system is shown and is referred to generally as 10. A nuclear fuel assembly 11, located in water, is lowered into a fuel assembly guide plate 12, through the guide plate 12, and into the boxlike container which is the fuel assembly storage cell 14. The plate 12 and the fuel assembly storage cell 14 provide the means of locating (and supporting) the fuel assembly with respect to the neutron detectors 16 and reflector plates 20. Trestles 18 (which form the stabilizing assembly) support the system.

In the first measurement of neutron count rate, with no cadmium next to the fuel assembly, the two rotating neutron reflector plates 20 are in the out position (for example are rotated out on axis A—A' and B—B') so that the plates 20 do not affect the reactivity of the fuel assembly (i.e., angle $\theta$ is at least 90° and is preferably 135°, which is the least reactive condition). Then, the plates 20 are positioned as shown in FIG. 2, and the second measurement is taken.

Alternatively, the pivot points could be located at other positions other than along the diagonals of the fuel assembly, for example along C—C', although this is not preferred.

Alternatively, the first measurement could be taken with the plates 20 in place as shown in FIG. 2; and the second measurement would then be taken with the plates 20 rotated out.

The neutron detectors 16 (numbering 1, 2, or more preferably on each of two opposite faces as shown) are preferably located within guide tubes 17 on opposite faces of the fuel assembly storage cell 14 and are parallel to the face of the fuel assembly and are fixed in their positions. The rotating plates 20 are preferably on opposite faces of the fuel assembly storage cell 14.

Motor and gear assembly 22 preferably located as shown is preferably used to rotate plates 12, although manual operation is alternatively possible.

Figure 3:
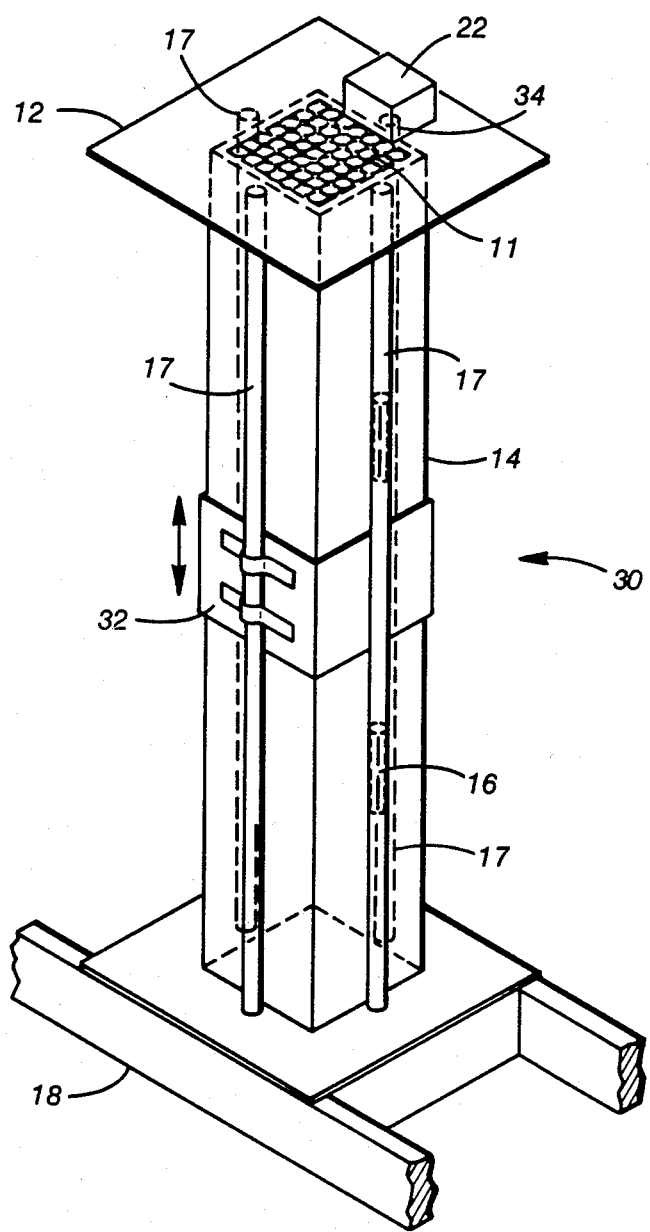
In FIG. 3 is shown an embodiment of apparatus of the invention utilizing axial scanning of a stationary fuel assembly. The reflector plates are the first reflector material, and the water is the second reflector material. A profile of the local multiplication constant can be obtained if desired.

In FIG. 3, an embodiment showing a scanning self-interrogation system is shown and referred to generally as 30. The system is located in water and has many of the same items which were shown in FIG. 2, including two detector tubes which are like those shown in FIG. 2, except that they are spaced apart from the fuel assembly. A slidable sheath 32 is slidably positioned between the guide tubes 17 housing the detectors and the fuel assembly storage cell 14.

The slidable sheath 32 is preferably driven along guide tube 17 by ball screw 34 by any suitable driver means, for example a motor and gear assembly 22. Sheath 32 surrounds the fuel on four sides, thus giving a high change in reactivity for a given area of sheath 32. Sheath 32 is made of the second reflector material (e.g., graphite, cadmium, or any material which will change the reactivity, either increasing or decreasing it, although for safety purposes a material which decreases the reactivity may be preferred for use).

Sheath 32 need not be a solid. For example, it could be a container housing deuterated water.

The number of measurements of a fuel assembly which would need to be made with a given sheath 32 depends upon the dimensions of the sheath. The entire length of the fuel assembly would need to be covered once by the sheath. As the sheath is raised or lowered, the area that it formerly covered is now uncovered; and the uncovered and covered portions can be measured simultaneously. The amount of time of the measurments equals the length of the fuel assembly divided by the vertical height of sheath plus the time needed for moving the sheath. A profile of the local multiplication at each point is obtained; and this can be averaged, if desired.

EXAMPLE

The following experiment was carried out. A series of calculations of the magnitude of change in the multiplication constant for a change in the reflector material and experimental verifications of those calculations were done. Two detectors were used, a thermal neutron detector and an epithermal neutron detector.

Figure 4:
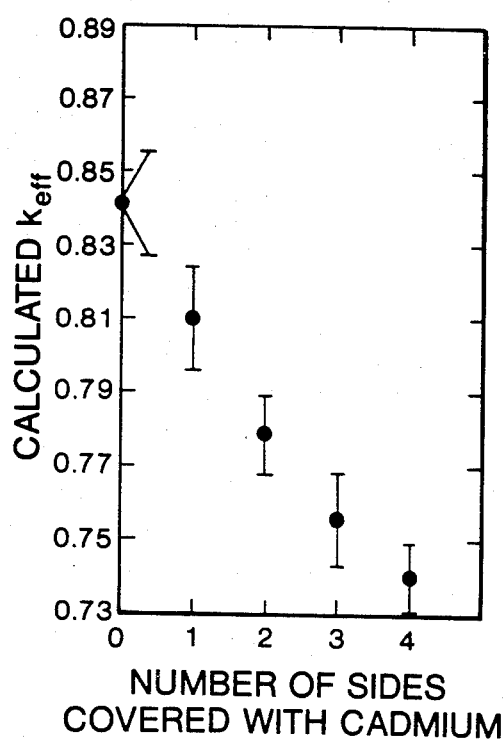
FIG. 4 is a graph of calculated effective multiplication constant vs. the number of sides covered with cadmium for the system described in the Example below.

A 15×15 rod PWR assembly with 3.2% enrichment was computer modeled for the calculation of $k_{eff}$ and $\Delta k_{eff}$. The Los Alamos National Laboratory Monte Carlo neutron transport code (MCNP), Los Alamos National Laboratory Report LA-7396, Los Alamos National Laboratory Group X-6, "MCNP-A General Monte Carlo Code for Neutron and Photon Transport," (June 1978), was used in the calculation of $k_{eff}$. The initial reflector material was water and the calculation of $k_{eff}$ was carried out for cadmium placed on one or more sides. The results are shown in FIG. 4. As expected, the multiplication constant decreased when cadmium was added. Substitution of the calculated $k_{eff}$ into Eq. (3) (see above) reveals that count rate changes up to 40% possible.

Figure 7:
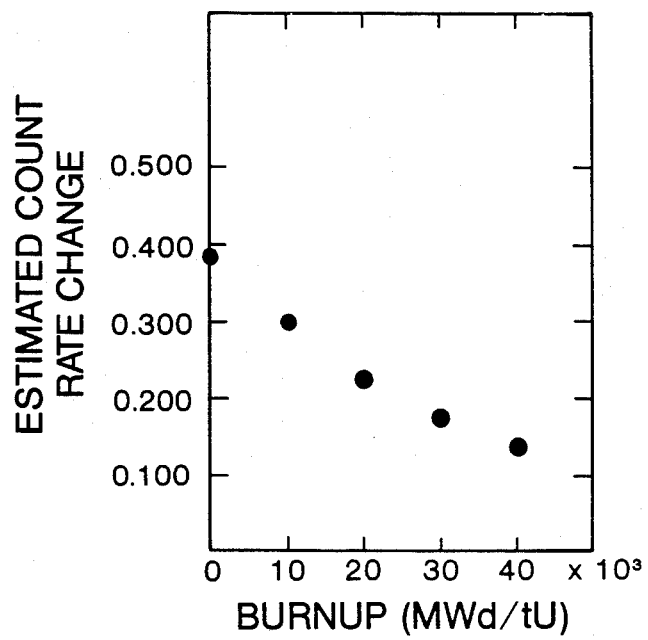
FIG. 7 is a graph of estimated fractional count-rate change vs. burnup for an extension of the results obtained in the Example below.
Figure 5:
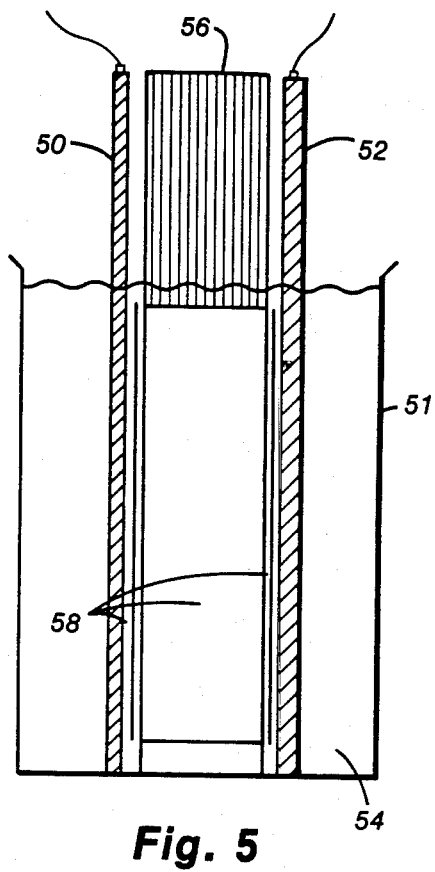
FIG. 5 is an illustration of the apparatus used in the Example below.
Figure 6:
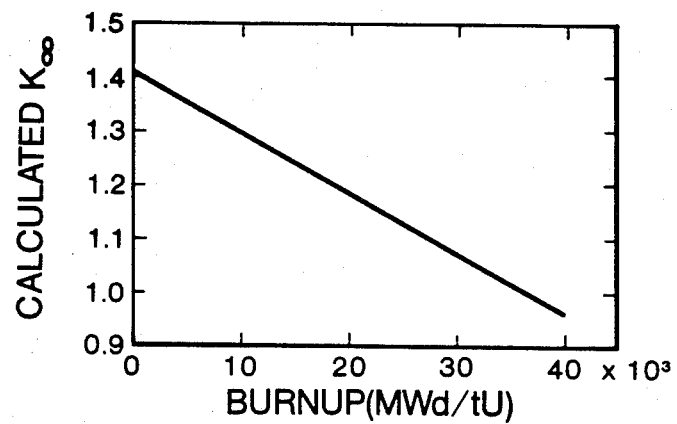
FIG. 6 is a graph from the literature.

The experimental setup is shown in FIG. 5. Although neither the experimental configuration shown in FIG. 2 nor FIG. 3 was used in the experimental verification, the configuration in FIG. 5 is conceptually identical to the configurations in FIGS. 2 and 3. The measurements made with the prototype had an aluminum frame on which cadmium sheets could be slid in and out. The experimental tests consisted of placing the PWR fuel assembly in water in a 200 liter barrel 51 and inserting a $^{252}$Cf isotopic neutron source ($3 \times 10^4$ n/s) into the assembly to simulate the normal neutron emissions from spent fuel. The thermal neutron detector 50 and epithermal neutron detector 52 measured the detection sensitivity for two different detection thresholds. Measurements were first made with distilled water 54 surrounding the PWR fuel assembly 56 and then with cadmium sheet(s) 58 placed in close proximity to one or more sides. The results of the measurements are shown in Table I. The calculated quantities were obtained by using Eq. (3) and the values of $k_{eff}$ found in FIG. 4. For the epithermal detection system the calculated and experimental values show good agreement, indicating that Eq. (3) is a satisfactory approximation for an epithermal system. However, with thermal detection, the measured count-rate changes consistently underestimated the calculated quantities. Extending these results to spent fuel of higher burnup was accomplished by substituting the burnup-dependent multiplication constant into Eq. (3). The burnup-dependent multiplication constant is shown in FIG. 6 (obtained from G. Schulze, H. Wurz, "Nondestructive Assay of Spent Fuel Elements." Internat. Meeting on Monitoring of Pu Contaminated Waste, Sept. 1979, ISPRA). This reference is hereby incorporated herein by reference. The estimated count-rate change for different burnups is shown in FIG. 7. This figure shows that at 35,000 MWd/tU, a precision of 2.4% on the count rate change is required for a 1000 MWd/tU precision on burnup. Repeat measurements have shown that this level of precision is possible.

FIG. 7 shows clearly that a reactivity change produced by a reflector change alone is an effective means of measuring burnup in spent fuel assemblies. This figure demonstrates the measurement method and apparatus of the invention.

The significant advantages of this technique used in this example are (1) no external isotopic neutron source is required, (2) the measurement can be performed at any cooling time, irrespective of the passive neutron rate, and (3) it is possible to do the measurement without any complex scanning system.

TABLE I
CALCULATED AND EXPERIMENTAL
AVERAGE COUNT-RATE CHANGES

| No. of Sides Covered With Cd | Experimental Epithermal | Experimental Thermal | Calculated |
|---|---|---|---|
| 1 | 0.19 | 0.08 | 0.17 |
| 2 | 0.26 | 0.17 | 0.28 |
| 3 | 0.34 | 0.27 | 0.35 |
| 4 | 0.38 |  | 0.38 |

The foregoing description of the preferred embodiments of the invention has been presented for purposes of illustration and description. It is not intended to be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular uses contemplated. It is intended that the scope of the invention be defined by the claims appended hereto.

We claim:

1. A nondestructive, non-invasive method of determining at least one quantity selected from the group consisting of fissile content, reactivity, and burnup of a fissile material contained within a multiplying system bounded by an arbitrarily chosen physical boundary, wherein said multiplying system comprises (a) said fissile material which emits neutrons and has fissionable components and (b) a second material which comes in contact with said fissile material, said method using no external neutron-emitting interrogation source, said method comprising:

(a) making a first measurement $N_A$ of emitted particle-count rate of at least one type of emitted particle selected from the group consisting of neutrons and gamma rays, wherein said at least one type of emitted particle is emitted by said fissile material, wherein said first measurement is made by using at least one suitable detector, and wherein a first reflector material is positioned adjacent to said multiplying system while said first measurement is made;

(b) making a second measurement $N_B$ of emitted particle-count rate of said at least one type of emitted particle emitted by said fissile material, wherein said second measurement is made by using at least one suitable detector, wherein a second reflector material replaces said first reflector material and is reproducibly positioned adjacent to said multiplying system while said second measurement is made; and then (c) using the equation $$\frac{N_A - N_B}{N_A} = M_B \Delta k_{eff},$$

wherein $M_B$ is the multiplication and $\Delta k_{eff}$ is the change in the effective multiplication constant $k_{eff}$, determine the local multiplication or average multiplication, and wherein said multiplying system is not changed during the time period in which steps 1(a) and 1(b) are performed.

2. A method according to claim 1, and including also the step of correlating either the multiplication or change in count rate to a quantity selected from the group consisting of burnup, reactivity, and fissile content with a functional relationship between the measured count rate of step 1(a) and the measured count rate of step 1(b), wherein said multiplying system is not changed during the time period in which steps 1(a) and 1(b) are performed.

3. A method according to claim 1 or claim 2, wherein multiple detectors are used to obtain a profile of a quantity selected from the group consisting of burnup, reactivity, and fissile content.

4. A method according to claim 3, wherein said first reflector material is water and wherein said second reflector material is cadmium.

5. A method according to claim 3, wherein said first reflector material is graphite and wherein said second reflector material is cadmium.

6. A method according to claim 3, wherein said fissile material being measured is a spent fuel assembly.

7. An apparatus for measuring at least one quantity selected from the group consisting of burnup, fissile content, and reactivity of a fissile material which emits neutrons, which has fissionable components, and which is located within a multiplying system, wherein said multiplying system is bounded by an arbitrarily chosen physical boundary and wherein said multiplying system comprises said fissile material and a second material which comes in contact with said fissile material, said apparatus comprising:
(a) a support means for supporting said multiplying system in a fixed, reproducible position;
(b) a detection system comprising at least one detector which detects at least one type of particle selected from the group consisting of neutrons and gamma rays, wherein said detection system is located in a fixed position spaced apart from said multiplying system and wherein said detection system can be operably connected to a means for operating said detection system;
(c) a first reflector material (i) to be located in a reproducible first position such that at least a portion of said first reflector material is located adjacent to but not necessarily surrounding said multiplying system while a first measurement is made with said detection system, and then (ii) to be next removed from said first position;
(d) a second reflector material to be located in substantially said first position when said first reflector material is removed from said first position and while a second measurement is made with said detection system; and
(e) a means for alternately positioning said first reflector material and said second reflector material adjacent to said multiplying system.

8. An apparatus according to claim 7, wherein said first reflector material is in the form of at least one removable rotating plate which can rotate toward and away from said multiplying system.

9. An apparatus according to claim 7, wherein said first reflector material is in the form of a slidable sheath which slides along said multiplying system.

10. An apparatus according to claim 8 or claim 9 wherein said first reflector material is cadmium and wherein said second reflector material is water.

11. An apparatus according to claim 8 or claim 9, wherein a multiplicity of detectors is used to obtain simultaneously a multiplicity of measurements of local multiplications.

12. An apparatus according to claim 9, wherein a motor drives said slidable sheath, thus providing a scanning system.

13. An apparatus according to claim 8 or claim 9 and including also said multiplying system.

14. An apparatus according to claim 13, wherein said fissile material is a spent fuel assembly.

* * * * *